Dec. 31, 1946.  W. P. MORRIS  2,413,367
MEASURING LINE STRIPPING BLOCK
Filed June 15, 1945   2 Sheets-Sheet 1
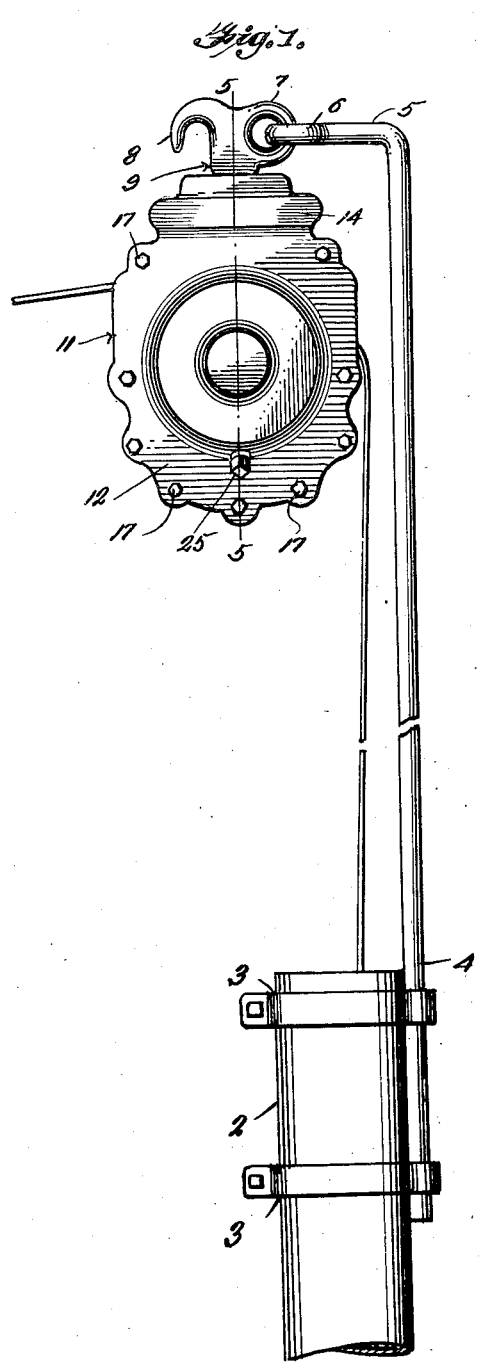
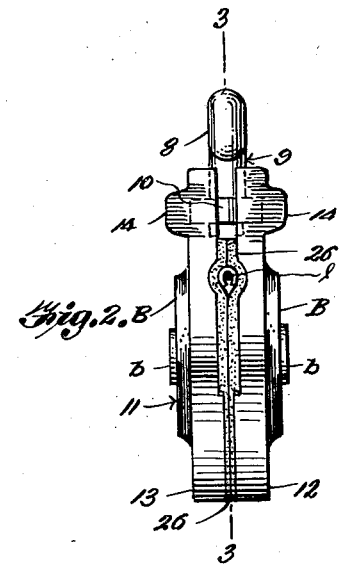
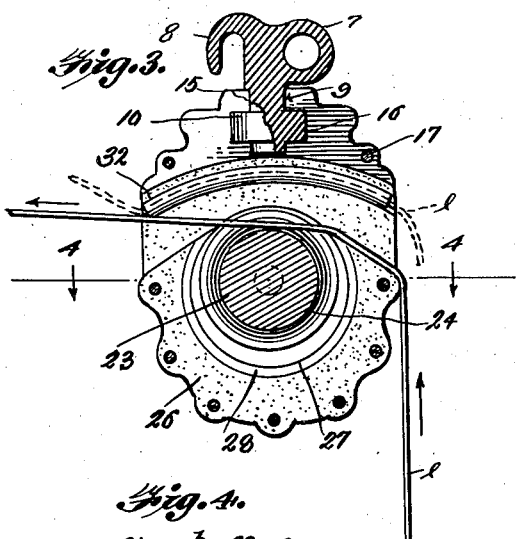
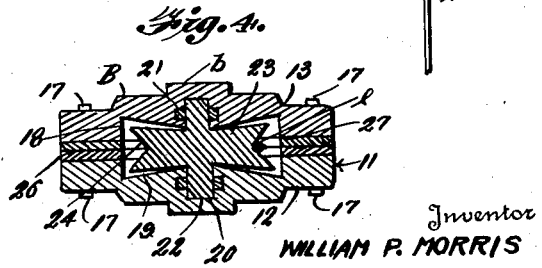
Inventor
WILLIAM P. MORRIS
By Randolph & Beavers
Attorneys

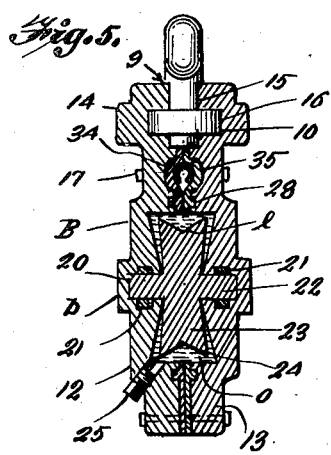
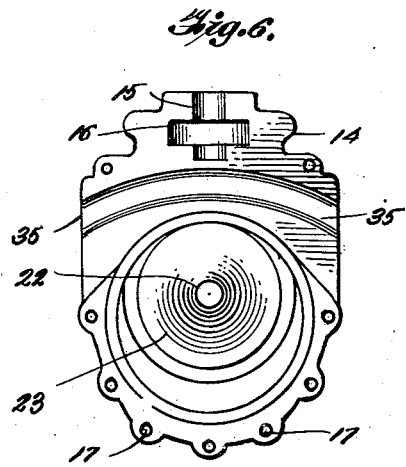
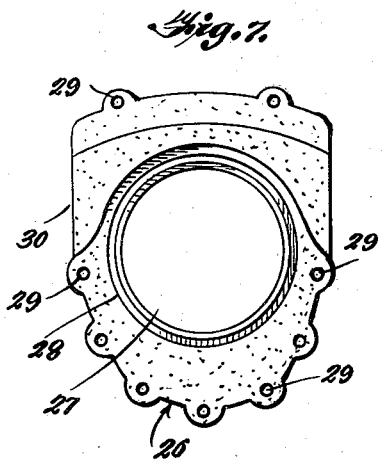
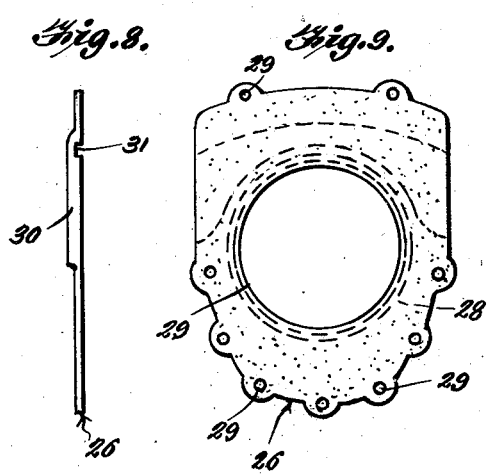
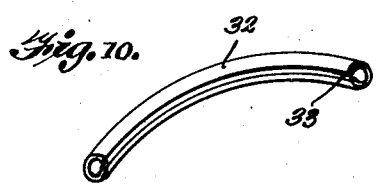

Patented Dec. 31, 1946

2,413,367

UNITED STATES PATENT OFFICE 2,413,367

MEASURING LINE STRIPPING BLOCK

William P. Morris, Lovington, N. Mex.

Application June 15, 1945, Serial No. 599,735

5 Claims. (Cl. 91—13)

This present invention relates to a sheave block for cleaning and oiling a measuring line after the same has been used for sounding the depth of wells containing oil or similar liquids or for other purposes.

The primary object of the invention is the design of a device answering the above purpose by including, therein means through which a measuring line may be threaded prior to spooling the same on a drum, and also including means for wiping the mud off the line and other means for oiling the line.

It is another object of the invention to construct a device of the class described which is inexpensive, simple and sturdy and in which the operation of cleaning precedes that of oiling and both are incident to the spooling of the line on the drum.

With the above and other objects in view as will become apparent as the invention is understood, the same resides in the combination and arrangement of parts as hereinafter set forth and illustrated in the accompanying drawings and claimed in the appended claims, it being understood that changes in the precise embodiment of the invention may be made within the scope of what is claimed without departing from the spirit of the invention.

In the drawings:

Fig. 1 is a front elevation of the preferred embodiment of my invention, supported above an oil well casing;

Fig. 2 is a side view of the casing;

Fig. 3 is a central vertical section on line 3—3 of Fig. 2;

Fig. 4 is a horizontal section on line 4—4 of Fig. 3;

Fig. 5 is an axial vertical section on line 5—5 of Fig. 1;

Fig. 6 is a view of the inner side of one half of the casing without the gasket;

Figs. 7 and 9 are views of opposite sides of one of the gaskets;

Fig. 8 is an edge view of one of the gaskets;

Fig. 10 is a perspective view of the split tube.

In the drawings in which like reference characters designate like or similar parts, numeral 2 denotes an oil well casing the upper end of which is clamped by a pair of clamps 3. These clamps also surround a rod 4 and clamp the same against the casing. The upper end portion 5 of the rod is bent to extend horizontally and terminates in an eye 6 which is interlinked with an eye 7. The latter is integral with or attached to a hook 8 whereby the structure now to be described may also be suspended.

The eye and hook are parts of a swivel 9 including a cylindrical flange 10 which is rotatably connected to a block or housing 11 consisting of two substantially identical parts or halves 12, 13. Each part has an outwardly enlarged and thereby reinforced socket head 14. The socket 15 formed in this head is semi-cylindrical and widened centrally at 16 and open at the top. One half of the swivel is received in this socket, one half of the flange 10 occupying the space 16. When the two halves are united by a plurality of screw bolts 17, the swivel cannot be extracted from its socket.

On the outer and wider sides of each housing half are formed concentric bosses B and b.

The inner or confronting sides of the two halves have each a central substantially cylindrical depression 18 the end walls 19 of which are conical and extend slightly inwardly. The space formed by the two depressions is partially occupied by oil o for a purpose which will become apparent as the description proceeds. Centrally of the conical end wall surfaces are formed bearing sockets 20 having widened intermediate portions occupied by bearing rings 21. The latter serve as journals for a pair of trunnions 22 each extending from the center of the conical and concave sides of a sheave 23 with a V-groove 24 at the periphery. The sheave is immersed in the housing section 12 which is provided with an oil hole closed by an oil plug 25.

In order to connect the two halves in a liquid-tight manner a pair of gaskets 26 is clamped between their opposing surfaces. Each gasket has a central hole 27 which registers with the sheave chamber described and is flat and of uniform thickness except as otherwise described. On the side of each gasket facing a housing section and surrounding the hole 27 is an annular rib or flange 28 which is seated in a corresponding annular depression in the housing half. Each gasket has a hole 29 registering with a bolt hole in the housing. The gasket portion 30 above the horizontal diameter through the hole 27 is thicker than the lower portion on the side facing the housing part (Fig. 8). In this portion is provided a curved groove 31 on the side facing the other gasket. In assembled condition these two grooves are widened and the material forming them is stretched by the insertion of a curved threading tube 32 of copper, steel, fiber, plastic or other suitable material. This tube has on its concave side a longitudinal slot 33 through which the measuring line after having been threaded through the tube, can be pulled between the contacting gasket surfaces to clean the mud therefrom. The insertion of the tube in the grooves of the gaskets causes the material on the outer side facing the half of the housing to bulge as shown at 34 and fill a groove 35 formed in the housing part.

Fig. 3 shows in dotted lines the measuring line extending through the threading tube to be spooled upon a drum (not shown). The pull of this drum causes the line to slip down through the longitudinal slot in the tube and between the confronting flat surfaces of the gasket until the cleaned line is seated on the sheave which is thereby rotated and oils the line.

It is to be understood that various arrangements and modifications other than that described above and illustrated in the accompanying drawings may be devised, and yet come within the spirit of this invention. Accordingly, it is the intention that the appended claims be construed broadly to cover such alternative arrangements and modifications.

What is claimed as new and useful is:

1. A device for cleaning and oiling a measuring line, housing, a threading member slotted on its lower side in the housing, a pair of gaskets in the housing and surrounding the threading member and having cleaning surfaces extending in the path of the line when emerging from the member through the slot, an oiling sheave rotatably mounted in the housing and receiving the line after passage between the cleaning surfaces, and an oil bath for immersing the sheave.

2. A device for cleaning and oiling a measuring line, comprising a housing consisting of duplicate sections a threading member open at both ends and slotted on its lower side in the housing, a pair of sealing members connecting the sections and enclosing the threading member and contacting one another on a plane containing the slot of the threading member, and oiling means operated by the measuring line for oiling the latter after its passage from the threading member and in the plane of contact.

3. A device for cleaning and oiling a measuring line, comprising a housing consisting of a pair of substantially duplicate halves bolted together, means cooperating with the housing for supporting the same in any one of a plurality of angular positions above an oil well casing, a pair of gaskets between the halves of the housing, a tubular threading member open at its ends and slotted on its lower side between the gaskets, means adapted to be rotated by the measuring line after the same has left the threading tube and passed between the gaskets and an oil bath for the last named means to oil the line rotating such means.

4. A device for cleaning and oiling a measuring line comprising a housing consisting of a pair of halves substantially duplicates of one another, each half being centrally recessed and circumferentially apertured, bolts in the apertures, an oiling sheave rotatably mounted in the space defined by the recesses and containing oil, a pair of gaskets having apertures registering with the recesses and interposed in contacting relation between the housing halves, threading means slotted in a direction facing the sheave clamped between the gaskets.

5. A device for cleaning and oiling a measuring line comprising a housing consisting of halves substantially duplicates of one another, each half having exterior centrally disposed bosses and an interior recess concentric therewith and circumferentially spaced bolt holes, the recesses defining a space partially filled with oil, an oil sheave immersed in the oil and rotatably mounted in the recess space, a pair of gaskets each having a central aperture registering with the recesses and in contacting arrangement clamped between the halves, threading means for threading the line having a slot in the plane of the contact surfaces of the gaskets, and bolts inserted in the bolt holes.

WILLIAM P. MORRIS.